F. PRZYBYSZ.
FIRE EXTINGUISHER.
APPLICATION FILED MAR. 23, 1918.
1,299,610.
Patented Apr. 8, 1919.
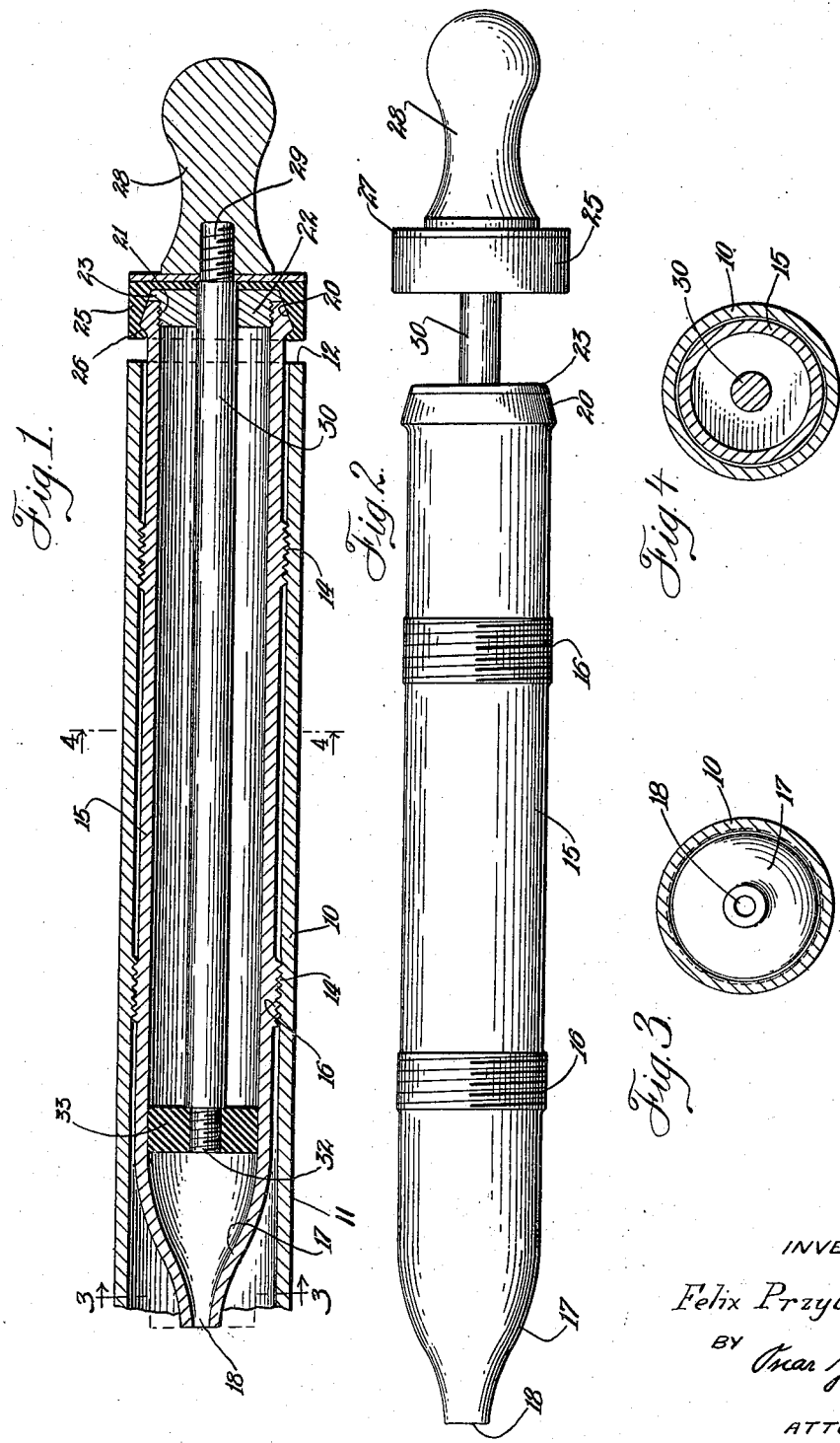
INVENTOR
Felix Przybysz
BY
ATTORNEY

UNITED STATES PATENT OFFICE.

FELIX PRZYBYSZ, OF JOLIET, ILLINOIS.

FIRE-EXTINGUISHER.

1,299,610.

Specification of Letters Patent. Patented Apr. 8, 1919.

Application filed March 23, 1918. Serial No. 224,297.

*To all whom it may concern:*

Be it known that I, FELIX PRZYBYSZ, a citizen of Poland, resident of Joliet, county of Will, and State of Illinois, have invented certain new and useful Improvements in Fire-Extinguishers, of which the following is a specification.

This invention relates to improvements in fire extinguishers and particularly to types adapted to be manually operated.

The principal object of the invention is to provide an efficient device by means of which a stream of water, or chemical solution, may be expelled forcibly so as to reach to a considerable distance, it being intended that the device be constantly filled ready for use.

A further object is to provide means whereby deterioration of the contents is prevented.

These and other like objects are attained by the novel construction and combination of parts hereinafter described and shown in the accompanying drawing, forming a material part of this disclosure, and in which:—

Figure 1 is a longitudinal sectional view taken through an implement made in accordance with the invention.

Fig. 2 is a side elevational view of the same the casing being removed.

Fig. 3 is a transverse sectional view taken on line 3—3 of Fig. 1, and

Fig. 4 is a similar transverse view taken on line 4—4 of Fig. 1.

The invention comprises an outer cylindrical casing 10 having a fixed bottom 11, and an open top 12. Formed at spaced intervals within the interior of the casing 10, are raised screw-threads 14, engaging with screw-threads 16 formed on the barrel 15, so that it be secured in the casing.

The barrel 15 is likewise of cylindrical construction, having a reduced conical end 17, terminating in an open mouth 18, at its inner lower end, its opposite outer end being enlarged and formed with a bevel 20, the interior having screw-threads 21, by means of which a rigid cap 22 having an extending flange 23 is secured. In order to form a liquid and airtight joint, a rubber annulus 25 having a coned surface 20, and inturned lips 26 is adapted to engage below the enlargement 20 so as to prevent air from entering therein. This annulus is supported, at its outer side, by a plate 27, which is positioned on the operating handle 28, into which enters the screw-threaded end 29 of a plunger rod 30, which passes through the plate 27, annulus 25 and cap 22, into the bore of the barrel 15.

Rigidly engaged at the inner end of the rod 30 by screw-threads 32, is a pliable plunger 33, so that as the handle 28 is drawn outward, the plunger moves upward within the barrel 15, creating a vacuum causing liquid contained in the lower end of the casing 10 to enter into the barrel and which obviously is forced outward upon the plunger being pushed toward the opening 18.

From the foregoing it will be seen that a compact and efficient device is presented, capable of delivering a stream of water at a considerable distance and, by reason of the peculiar form of connection at the upper end of the piston rod, leaking is prevented, as well as the admission of air so that the contents can be retained for a lengthy period without loss.

Having thus described my invention what I claim as new and desire to secure by Letters Patent, is—

1. In a fire extinguisher, the combination with a cylindrical barrel, a plunger operable therein, and a casing engaged by screw-threads to said barrel, of a rigid cap at the outer end of said barrel, a plunger rod passing through said cap, a handle engaged with said rod, and a pliable annulus carried by said handle surrounding the joint between said barrel and said cap.

2. In a fire extinguisher, the combination with a cylindrical barrel and a casing engaged therewith, of a plunger movable in said barrrel, a plunger rod attached thereto, a handle at the upper end of said plunger rod, a rigid cap engaged at the end of said barrel adjacent to said handle, a rubber annulus surrounding the joint between said cap and said barrel and a reinforcing plate exterior of said annulus.

In testimony whereof, I have affixed my signature.

FELIX PRZYBYSZ.

Copies of this patent may be obtained for five cents each, by addressing the "Commissioner of Patents Washington, D. C."